Jan. 31, 1967 JEAN-CLAUDE LAVENIR 3,302,184
SYSTEM OF CHARGING SUBSCRIBERS AND FOR THE
REMOTE READING OF TELEPHONE CHARGES
Filed Dec. 5, 1963 3 Sheets-Sheet 1

INVENTOR
JEAN-CLAUDE LAVENIR
BY
Abraham A. Saffitz
ATTORNEY

Jan. 31, 1967 JEAN-CLAUDE LAVENIR 3,302,184

SYSTEM OF CHARGING SUBSCRIBERS AND FOR THE REMOTE READING OF TELEPHONE CHARGES

Filed Dec. 5, 1963 3 Sheets-Sheet 2

INVENTOR
JEAN-CLAUDE LAVENIR
BY
Abraham A. Saffitz
ATTORNEY

INVENTOR
JEAN-CLAUDE LAVENIR
BY
Abraham A. Saffitz
ATTORNEY 3,302,184

SYSTEM OF CHARGING SUBSCRIBERS AND FOR THE REMOTE READING OF TELEPHONE CHARGES

Jean-Claude Lavenir, 28 Ave. Welschinger, Viroflay, France

Filed Dec. 5, 1963, Ser. No. 328,363
Claims priority, application France, Dec. 7, 1962, 917,941
4 Claims. (Cl. 340—172.5)

The present invention relates to a system of charging subscribers and for the remote reading of telephone charges, and more particularly to a system of the type in question applicable to a switching network of the cross-bar type.

It is known that the system generally used to charge a calling subscriber consists in connecting to said subscriber's telephone line, a pulse counter, known as a subscriber's meter, which is controlled through a meter wire connected, at the same time as the subscriber's line wires and throughout the whole duration of the conversation, to an appropriate pulse generator known as a charger. It follows that a subscriber's meter and a meter wire to control said meter have to be connected to each subscriber's line and that the meter wire and the subscriber's meter are only used during this subscriber's calls.

Cross-bar charging systems are known wherein the supervision of the charging is effected at junctors inserted in the links between the subscriber selection stages and the group selection stages of the cross-bar system. The switching of the subscriber selection stages is known and is non-numerical for the initiating calls while the switching of the same stages is numerical for the terminating calls, i.e. it is then controlled through a marker by the called subscriber number stored in a register. As regards initiating calls, charging is thus controlled through junctors inserted between non-numerical switching stages and numerical switching stages. Since the charge pulses are tested in the junctor and must be applied to the subscriber's meter, it is necessary to set up a correspondence between the junctor used in the communication and the calling subscriber and this is done through a matrix whose lines and columns are connected to the junctors and to the subscriber meters respectively. This system requires that the number and/or address of the calling subscriber be kept in memory during the entire duration of the call.

An object of the present invention is to provide a charging system comprising at the same time junctor meters and subscriber meters, means for storing the charge in the junctor meters during the duration of the call and means for transferring the charge from the junctor meters to the subscriber meters at the end of the call. The number of the calling subscriber is put into memory in the junctor meter at the beginning of the call and serves as an address for the transfer of the charge into the subscriber meter.

Another object of the invention is to provide a charging system permitting the remote reading of the meters.

Since the supervision of the charging is effected at the junctors inserted in the links between the subscriber selection stage and the group selection stage and since said junctors may be connected to any calling subscriber, it is necessary to record, for each charge, the number or address of the calling subscriber to whom it should be debited. The charging system comprises means for detecting, on the one hand the operating conditions of the junctors and more specifically the removal and replacement of the subscriber's receiver and the beginning and end of the charge pulses, and on the other hand the numbers or addresses of the calling subscribers, means for recording this data in temporary stores associated with the junctors for the duration of the calls made by said calling subscribers simultaneously with the charge pulses transmitted through the junctor with which the temporary store is associated, each temporary store in an engaged junctor thus containing, at a given moment, a first datum consisting of the address of the calling subscriber connected to said junctor and a second datum consisting of the present charge for this current call, and means for transferring, at the end of the current call, the charge for said call to semi-permanent stores associated with the calling subscribers and containing the accumulated charges of these subscribers. The system further comprises a system for scanning the subscribers' semi-permanent stores and for transmitting the data contained therein. A telephone accounts department remote from the spot where the subscribers' semi-permanent stores are situated can thus read these stores which act as subscribers' meters.

The invention will now be described in detail with reference to an example of an embodiment wherein the crossbar switching system is of the type known by the name of CP 400 and wherein the temporary stores for the junctors and the subscribers' semi-permanent stores are compartments on a magnetic drum. The detailed description will be given with reference to the accompany drawings in which:

FIGURES 1 and 2 illustrate the surface of the magnetic drum 100, the magnetic tracks on said surface and the corresponding writing, reading and erasing heads. This magnetic surface comprises a certain number of tracks, there being eleven in the example selected.

Figure 1:
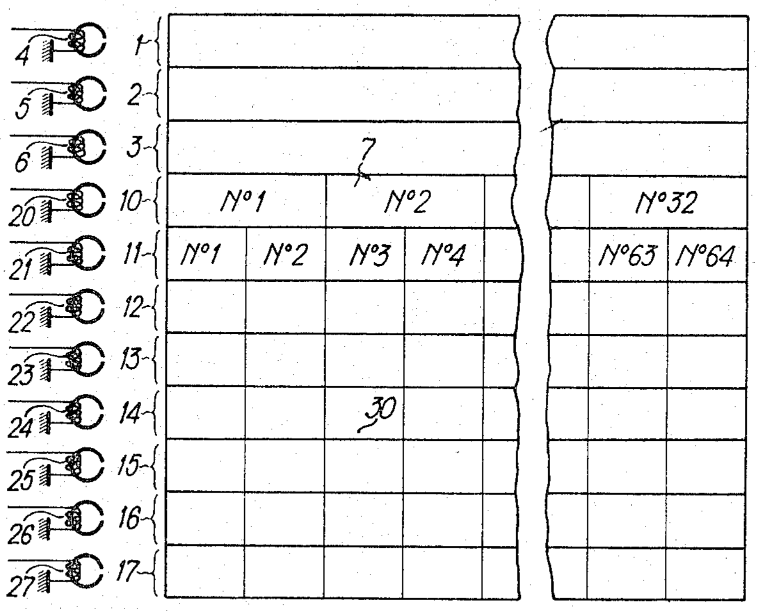
FIGURES 1 and 2 illustrate respectively the magnetic drum constituting the junctor and subscribers' stores, and an enlargement of a region of said drum.
Figure 2:
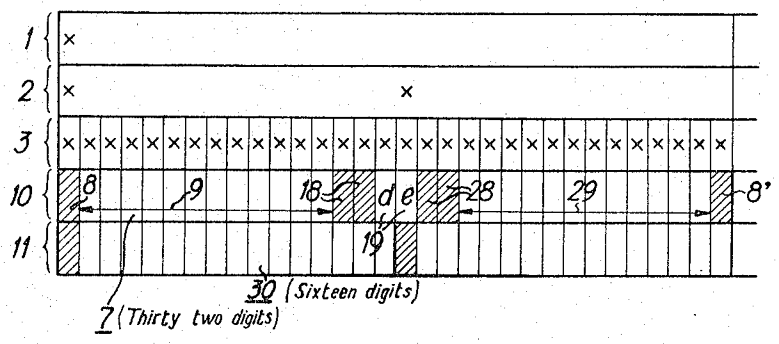

First of all there are three timing tracks. The first, 1, contains one binary digit One per revolution. The passage of this binary digit One in front of the reading head 4 associated with the track 1 marks the beginning of the cycles. The second track 2 contains sixty-four binary digits One, likewise spaced per revolution. Since, as will be seen, there are sixty-four locations or subscribers' meter compartments on each of the tracks 11 to 17 and these form the subscribers' semi-permanent stores referred to at the beginning, the sixty-four binary digits in track 2 read by the head 5 constitute the angular addresses of these subscribers' meter compartments. The third track 3 contains one thousand and twenty-four binary digits One, likewise spaced per revolution. Since, as will be seen, there are sixteen binary-digit locations or subcompartments in each of the meter compartments or bit memories, the one thousand and twenty-four digits in the track 3 read by the head 6 constitute a sequence of timing pulses which regulate the writing, the reading and in general the transfer of the binary digits representing the data throughout the charging system. In FIGURE 2, the regions in the tracks 1 to 3 where the binary digits One are recorded are represented by crosses.

Next on the drum 100 there are eight tracks which are numbered 10 to 17 and which are associated with reading and writing heads 20 to 27.

The first track 10 in this group forms the temporary store for recording the addresses of the callers, the call charges and the operating conditions of the junctors referred to at the beginning. It comprises thirty-two compartments 7 each corresponding to a junctor and which will be called junctor meter compartments. In each of these compartments it is possible to record thirty-two binary digits in thirty-two sub-compartments or bit memories. From one end to the other of a compartment 7 there is found an empty sub-compartment 8, twelve sub-compartments 9 in which is written the address of the subscriber, two empty sub-compartments 18, two sub-compartments 19 in which the operating condition of the associated junctor is written in code, two empty sub-compartments 28, twelve sub-compartments 29 in which is written the charge for the call and finally an empty sub-compartment 8'.

The tracks 11 to 17 form the semi-permanent stores taking the place of subscribers' meters referred to at the beginning. Each of these tracks comprises sixty-four compartments 30 each corresponding to a subscriber and known as subscribers' meter compartments as already stated. Since there are seven tracks of subscribers' meter compartments and sixty-four compartments per track, this makes 448 subscribers' meter compartments. Since a subscriber stage of a CP 400 automatic switch only comprises four hundred subscribers, some subscribers' meter compartments are unused. In each of these compartments 30, it is possible to record sixteen binary digits which represent the accumulated charges of the corresponding subscriber. Thus the subscribers' meter compartments have a shorter length by half than the junctor meter compartments. The purpose of the charging device is to record, at the beginning of a call taking place through a given junctor, the address of the caller, to record, in the course of the call, the charging pulses in the meter compartment of the junctor in question, and to transfer the recorded charge to the subscriber's meter compartment at the end of the call, after having added it to the total already contained in said meter compartment.

It is well known that a subscriber selection stage 101 (FIG. 3) and a group selection stage 102 of an automatic crossbar switch of the CP 400 type each comprises two switch bays known as "M bays" and a switch bay known as "J bay". To each of each of the horizontals of the "M bays", M*g* and M*d* are connected two hundred subscribers' lines. The horizontal of the "J bay" are connected to the verticals of the M bays and the verticals of the J bay are connected to the outgoing links leading to junctors 103 and the incoming links coming from the group selection stages 102. It will be assumed that the number of links and junctors connected thereto is thirty-two since it has already been stated that they were equal in number to the junctor meter compartments.

When a subscriber lifts his receiver, his call is detected and his line is connected to any one of the idle junctors through an M bay and the J bay. It should be noted that one call and only one is handled at a time in the subscriber stage, that is to say if two subscribers pick up their receivers simultaneously they will be connected one after the other to two different junctors. Moreover, a given subscriber keeps his junctor engaged until the end of the call and only releases it on hanging up again.

When a subscriber's line is connected to a junctor, it is known that in the CP 400 crossbar system, the number of the calling subscriber is recorded in the course of a few hundred milliseconds on a single group of relays situated at the bottom of the M bays. In these circumstances, it will be understood that it is possible to know to which subscriber a junctor is connected; for this it is sufficient to supervise the junctor. As soon as an engaged signal appears at the calling subscriber side of this junctor, the state of the marking relays is noted and stored in the junctor meter. If this operation is carried out sufficiently rapidly, say in less than 150 milliseconds, it is certain that this number does in fact correspond to the subscriber who has just been connected to the junctor. Moreover, if this subscriber's number is stored, the number of the subscriber who is speaking is known so long as the junctor remains engaged.

More specifically, each link comprises two speech wires, a test wire known as "*d* wire" and a metering wire known as "*e* wire." The state of the wires *d* and *e* or more exactly the state of the terminals of said wires in the junctor on the side of the calling subscriber is supervised by the charging device. When these wires are at zero potential, they will be said to correspond to binary digits *d* and *e* both equal to zero and when said wires are at a marking potential, they will be said to correspond to binary digits *d* and *e* both equal to one. With this convention, the following table gives the value of the binary digits *d* and *e* corresponding to various conditions of operations:

| Conditions of operation | Digit *d* | Digit *e* |
|---|---|---|
| Lifting the receiver | 1 | 0 |
| Beginning of a charging pulse | 1 | 1 |
| End of a charging pulse | 1 | 0 |
| Replacing the receiver | 0 | 0 |

The terminals *d* and *e* of the thirty-two junctors 103 are connected to the terminals $d_1$ to $d_{32}$ and $e_1$ to $e_{32}$ of a scanner 31 which successively scans the terminals $d_1$–$e_1$, $d_2$–$e_2$ . . . $d_{32}$–$e_{32}$ in synchronism with the rotary drum, that is to say, the scanner scans the *d* and *e* terminals of a given junctor when the metering compartment of said junctor passes under the reading head 20 for track 10 on the drum. In fact the advance of the scanner is controlled through the wire 132 by the signal picked up by the reading head 5 through a divider by two 32: thus one control pulse is obtained per junctor.

The contacts of the marking relays of the subscriber selection stage 101 (10 units relays, 10 tens relays, 4 hundreds relays) are connected to a decimal-binary converter 34 which converts the subscribers' addresses into ten-digit binary numbers over the wires 251–260 (since twelve subscribers' address bit memories have been provided, there are two surplus bit memories). The wires 251–260 are connected to ten elemental stores of a transit store 35 comprising thirty-two elemental stores or cells, for example a store comprising thirty-two flip-flops. This store is a circulating or stepping store with two inputs. The first input is a series input 36 connected to the heads of the drum by means of a matrix $38_1$ with eight rows and one column and of an amplifier 39. The second input is a parallel input itself composed of a plurality of inputs: terminals 51–60 connected respectively to the wires 251–260 originating from the decimal-binary converter 34 and adapted to introduce the calling subscriber's address into the store, terminals 61–62 connected respectively to the outputs *d* and *e* of the scanner 31 and adapted to introduce the operating condition of the junctor into the store, terminals 63–74 connected respectively to an adding circuit 45 and to a binary counter 41, which is itself connected to the output *e* of the scanner 31. The counter 41 counts One each time a new charging pulse is detected by the scanner 31 for a given junctor. The connection of the terminals 63–74 either to the counter 41 or to the adding circuit 45 is under the control of a control circuit 46. The terminals 63–74 are therefore adapted to introduce the new charge into the store 35. It should be noted that the counter 41 counts the charge pulses and that theoretically it would be sufficient to connect its input to the output wire *e* of the scanner 31 without any precautions.

Nevertheless, the cycle of this scanner is much shorter than a charge pulse and in consequence one charge pulse is therefore scanned several times. In consequence, with the object of only counting each charge pulse once, the input of the counter 41 is provided with a gate circuit which is only open for a fresh pulse $e=1$ if there was previously a pulse $e=0$.

The transit store 35 comprises a series output 37 connected through the amplifier 40 and the matrix $38_2$ with eight rows and one column to one of the eight heads 20–27 of the drum 100, and a parallel output which, like the parallel input, is subdivided into a plurality of outputs. The terminals 151–154 of the bit memories of the store connected to the terminals 51–54 are connected through the wires 351–354 to a track address register 42. The terminals 155–160 of the bit memories of the store connected to the terminals 55–60 are connected through the wires 355–360 to a subscribers' meter-compartment address register 43. The output terminals 161–162 of the bit memories of the store connected to the input terminals 61–62 are connected to a comparator 44. The terminals 163–174 of the bit memories of the store connected to the terminals 63–74 are connected through the wires 363–374 to the adding circuit 45.

The track address register 42 converts the binary number which it receives through the connecting wires 351–354 into a pulse over one of the wires 421–428, which has a duration of one revolution of the drum. Such address registers with spatial allocation are well known in the art and do not need to be described in detail. The compartment address register 43 converts the binary number which it receives over the connecting wires 355–360 into a pulse over the wire 431, which pulse either has the duration of the passage of a junctor meter compartment or the duration of the passage of a subscriber's meter compartment and may assume either thirty-two or sixty-four positions in a cycle of rotation of the drum. Such address registers with time allocation are well known in the art; they may comprise, for example, a delay line having sixty-four graduated taps such that the delay between two taps is equal to the portion of the cycle corresponding to a subscriber's meter compartment, means for applying a pulse having this delay as its duration, at the beginning of each cycle, and means for inhibiting all the taps in the delay line except one. When the register 43 has to give the address of a junctor meter compartment and not that of a subscriber's meter compartment, the duration of the pulse should be doubled and every other tap should be inhibited. Since this should be the case when a signal appears over the wire 421, two gate circuits 432 and 433 are shown rendered conducting by a signal present on each of the wires 421 and 132 and the gate circuit 433 is rendered conducting when there is a signal on wire 132 and no signal on wire 421.

The terminals 161 and 162 of the store 35 are connected to the comparator 44 as are the output terminals $d$ and $e$ of the scanner 31. As will be seen in the explanation of the mode of operation, the contents of the junctor meter compartments of the track 10 are transferred in sequence to the store 35, this transfer taking place in synchronism with the advance of the scanner in such a manner that one junctor is being scanned precisely when the contents of its associated meter compartment are in the store 35. The comparator 44 therefore compares the present digits $d$ and $e$ of a junctor with the digits $d$ and $e$ of this same junctor during the scanning immediately before (or during an earlier scanning if there was no change in the digits during the scanning immediately before).

If the former digits (digits reaching the comparator through the wires 361 and 362) are $d=0$ and $e=0$ (idle junctor) and the new ones are $d=1$ and $e=0$ (junctor engaged), it means that the subscriber has picked up his receiver. If the former digits are $d=1$ and $e=0$ and the new ones are $d=0$ and $e=0$, it means that the subscriber has hung up. If the former digits are $d=1$ and $e=0$ (junctor engaged) and the new ones are $d=1$ and $e=1$, it means the beginning of a charge pulse. Finally, if the former digits were $d=1$ and $e=1$ and the new ones are $d=1$ and $e=0$, it means the end of a charge pulse.

According to the result of the comparison carried out by the comparator 44, this transmits a signal to a programmer 47 over one of the wires 4701 to 4704. On the other hand, a fifth wire 4705 coming from the telephone accounts office, likewise comes to the programmer 47. The programmer executes a series of instructions which depend on the wire through which the signal which actuates it arrives. Whatever this signal may be, all the programs comprise the stopping of the scanner 31 and the blocking of the amplifier 39 during the time when the instructions are being carried out and a fresh starting of said scanner and unblocking of said amplifier when said execution is completed, said starting taking place in such a manner as to maintain synchronism with the drum 100.

Figure 3:
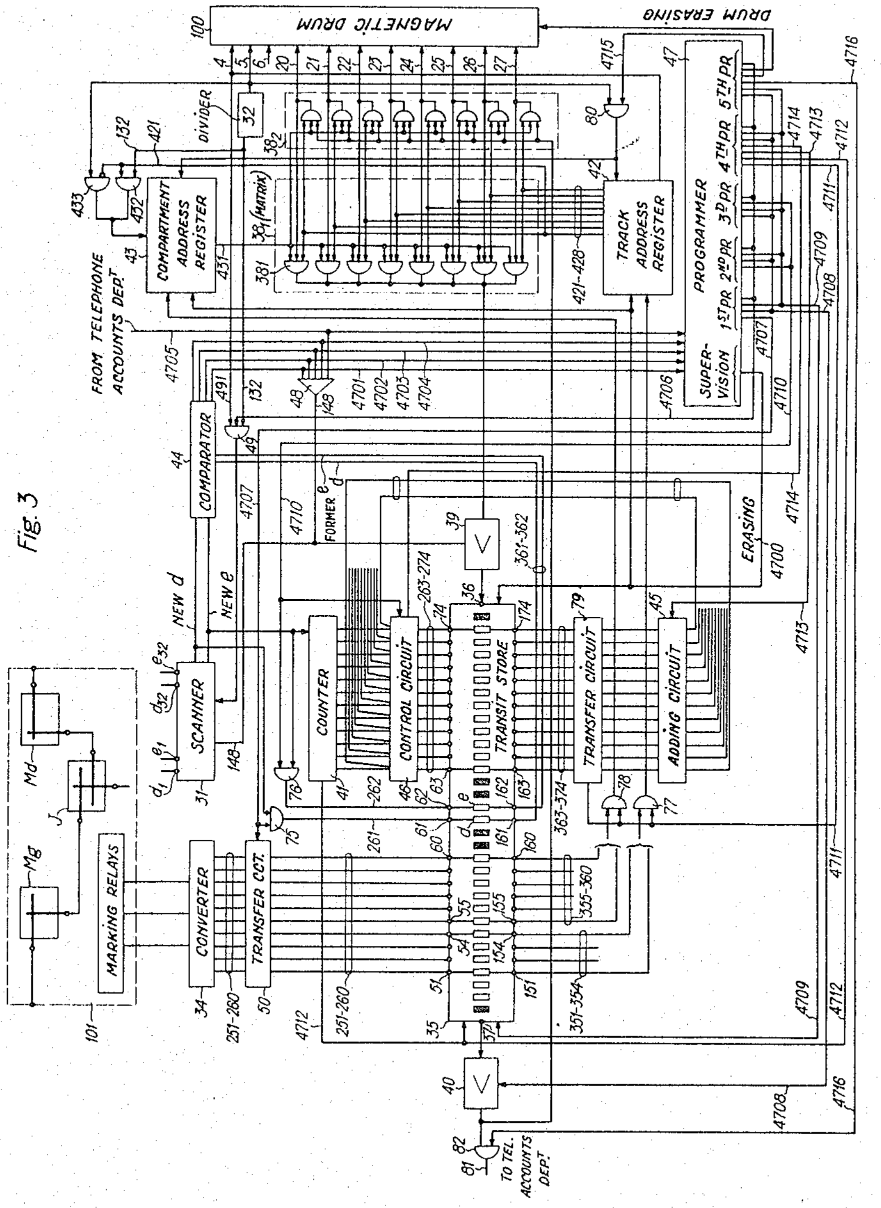
FIGURE 3 illustrates in the form of a block diagram the charging system according to the invention.

Programmers which carry out a series of successive instructions when they have received an actuating signal are well known in the art and do not need to be described in detail here. U.S. Patent 3,274,343, issued September 20, 1966, for example, explains the construction of a programmer forming part of a telephone concentrator. In FIGURE 3, the number of the program is entered beside each connecting wire leaving the programmer; sometimes there is only one wire for a plurality of instructions but it is understood that these various instructions may be appropriately staggered in time.

The stopping of the scanner 31 and the blocking of the amplifier 39 are carried out through the OR-gate circuit 48 and the connecting wire 148. The starting is effected through the wire 4706 common to all the programs and the AND-gate circuit 49 which receives a timing signal from the track 1 through the wire 491 and a stepping-on signal through the wire 132. The signal arriving over the wire 491 serves to preserve the synchronism between the scanner and the drum.

In the absence of an output signal from the comparator 44, the matrix 38 is in the state in which the gate circuit 381 is open and the data contained in each junctor meter compartment of the track 10 are transferred in sequence to the store 35 and are then erased in this store as a result of a signal transmitted by the programmer through the wire 4700.

At the moment when the comparator detects the lifting of a receiver, the meter compartment of the junctor on which this lifting of the receiver is detected is empty or, in other words, only contains zero digits. Thus the former $d$ and $e$ were both equal to zero and the new $d$ and $e$ are respectively equal to one and zero. A signal is transmitted over the wire 4701 corresponding to the first program. This program comprises, apart from the stopping and the subsequent restarting of the scanner common to all the programs:

The transfer of the subscriber's address from the converter 34 to the store 35 (memories of the store connected to the input terminals 51–60); this transfer is effected by the unblocking of the circuit 50 with ten AND-gates and through the control wire 4707;

The marking of the engagement of the junctor ($d=1$) by the writing of the digit One in the memory of the store 35 connected to the input terminal 61; this marking is effected through the unblocking of the gate circuit 75 through the control wire 4707;

The transfer to the junctor meter compartment 7 of the data written in the store; this transfer is effected by the unblocking of the amplifier 40 through the control wire 4708 and the control of the stepping on of the transit store 35 through the control wire 4709.

At the moment when the comparator detects the beginning of a charge pulse, a signal is transmitted over the wire 4702 corresponding to the second program.

This program comprises:

The transfer of the metering pulse from the counter 41 to the store 35 through the wires 263–274 and the control circuit 46 controlled by the wire 4710;

The marking of the state of the $e$ terminal of the junctor ($e=1$) by the writing of the digit One in the memory of the store 35 connected to the input terminal 62; this marking is effected by the unblocking of the gate circuit 76 through the control wire 4710;

The transfer to the junctor meter compartment 7 of the data written in the store; this transfer is effected by the unblocking of the amplifier 40 through the wire 4708 and the control of the stepping on of the transit store 35 through the connecting wire 4709.

At the moment when the comparator detects the end of a charge pulse, a signal is transmitted over the wire 4703 corresponding to the third program. This program comprises:

The marking of the state of the *e* terminal of the junctor ($e=0$) by writing the digit zero in the memory of the store 35 connected to the input terminal 62; this marking is effected by the unblocking of the gate circuit 76 through the control wire 4710;

The transfer to the junctor meter compartment 7 of the data written in the store; this transfer is effected as in the case of the first and second programs.

At the moment when the comparator detects the replacement of a receiver, a signal is transmitted over the wire 4704 corresponding to the fourth program. This program comprises:

The transfer of the subscriber's address to the track address register 42 and to the compartment address register 43; this transfer is effected through the opening of the gate circuits 77 and 78 through the control wire 4711;

The transfer of the fresh charge contained in the store 35 to the adding circuit 45 by opening the gate circuit 79 through the wire 4711;

The resetting to zero of the memories in the store 35 connected to the terminals 51 to 60 and 61 and 62 and of the counter 41 through the wire 4712;

The bringing of the amplifier 39 into communication with the subscriber's meter compartment through the registers 42 and 43 and the transfer of the contents of this meter compartment to the store 35 where they occupy the memories connected to the terminals 61 and 62, the two unoccupied cells to the right of the memories connected to 62 and the cells connected to the terminals 63 to 74;

The transfer of the former charge contained in the store 35 to the adding circuit 45 through opening of the gate circuit 79 through the wire 4711;

The addition of the new charge and of the old charge in the adding circuit 45 controlled by the programmer 47 through the control wire 4713;

The transfer of the cumulative charge from the adding circuit 45 to the store 35 through opening of the control circuit 46 through the control wire 4714;

The transfer of the cumulative charge written in the store 35 to the subscriber's meter compartment through the unblocking of the amplifier 40 through the wire 4708 and the control of the stepping on of the transit store 35 through the connecting wire 4709;

The restoration of the track address register and compartment address register to the position of rest in which the head 20 is connected to the single column of the matrixes $38_1$ and $38_2$ and the starting of the scanner 31, these two instructions being given through the control wire 4706.

At the moment when the programmer detects a signal arriving by the line 4705 coming from the telephone accounts department, the programmer 47 initiates a fifth program which comprises (apart, of course, from the stopping and the subsequent re-starting of the scanner):

Operation as a counter of the registers 42 and 43 which extract successively from the subscribers' meter compartments the information contained therein, which information is transferred to the store 35; this operation as a counter is obtained by applying the signals coming from the reading head 5 through the gate circuit 80, the opening of which is controlled through the control wire 4715;

The transmission of the information transferred in sequence to the store 35 over the line 81 through the gate circuit 82, itself controlled by the control wire 4716 (the stepping on of the transit store 35 is assured by a signal over the wire 4709 and the amplifier 40 is unblocked by a signal over the wire 4708;

The erasing of the entries in the subscribers' meter compartments on the magnetic drum 100.

The various circuits in the diagram of FIGURE 3 are known in the art. Only the store 35 will be described in detail, which store comprises one input and one output for serial binary digits and several inputs and outputs for parallel binary digits and also means for erasing binary digits written in the store. This description is given with reference to FIGURE 4.

The store 35 comprises a register 83 which receives stepping pulses from the reading head 6 and a store proper 86 comprising thirty-two flip-flops $87_0$ to $87_{31}$. The register 83 comprises an input terminal 85 to which are applied the pulses picked up by the reading head 6 and thirty-two outputs $84_0$ to $84_{31}$ which are marked in sequence by a marking potential.

The output line of the matrix $38_1$ which leads to the input 36 of the store 35 via amplifier 39 consists of two wires 88 and 89 over one of which are transmitted the binary digits One and over the other of which are transmitted the binary digits Zero. Similarly, the input line of the matrix $38_2$ which comes from the output 37 of the store 35 via amplifier 40 consists of two wires 98 and 99 over one of which are transmitted the binary digits One and over the other of which are transmitted the binary digits Zero. Between the wire 88 and each of the "One" parts of the flip-flops $87_0$ to $84_{31}$ are interposed gate circuits 92 and between the wire 89 and each of the "Zero" parts of these same flip-flops are interposed gate circuits 93. Connected to each of the outputs $84_0$ to $84_{31}$ of the register 83 are gate circuits 102 and 103. The gate circuit 102 of a given output $84_n$ has its second input connected to the "Zero" part of the flip-flop $87_n$ and the gate circuit 103 of this same output $84_n$ has its second input connected to the "One" part of the flip-flop $87_n$. The outputs of the gate circuits 102 are connected to the second inputs of the gate circuits 92 and, by means of a diode 104, to the output wire 99 of the output line of the store 35 over which the Zero digits are transmitted. The outputs of the gate circuits 103 are connected to the second inputs of the gate circuits 93 and, by means of a diode 105, to the output wire 98 of the output line of the store 35 over which the digits One are transmitted.

The operation is as follows:

Counting pulses arrive in series over the wire 4709 at the input 85 of the register 83 in synchronism with the arrival of the digits One or Zero over the wires 88 and 89. On the arrival of the first counting pulse, a marking potential is applied to the terminal $84_0$ and consequently to the first inputs of the gate circuits 102 and 103. According to whether the flip-flop $87_0$ contains a one or a zero, that is to say according to whether a signal is present on the wire 96 or 97, it is the gate circuit 103 or the gate circuit 102 which becomes conducting and consequently the digits One are indeed transmitted in series over the wire 98 and the digits Zero in series over the wire 99.

Figure 4:
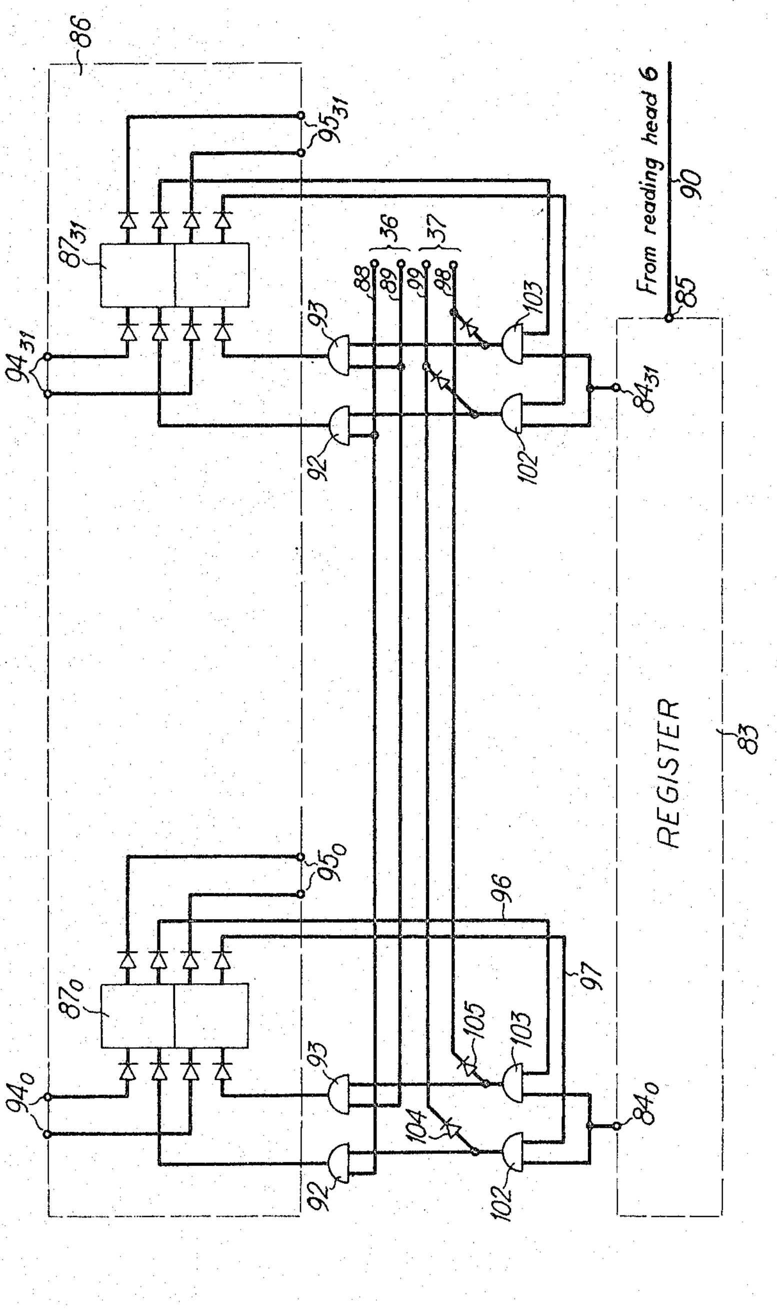
FIGURE 4 shows in more detail the stepping store incorporated in the system.

If the flip-flop $87_0$ is currently in the One state and a digit Zero arrives over the wire 89, it has been seen that a signal would leave the gate circuit 103 and consequently the gate circuit 93 receives a signal at both its inputs; it acts on the Zero part of the flip-flop $87_0$ to bring it into the Zero state. In a similar manner, if the flip-flop $87_0$ is currently in the Zero state and a digit One arrives by the wire 88, it has been seen that a signal would leave the gate circuit 102 and consequently the gate circuit 92 receives a signal at both its inputs; it acts on the One part of the flip-flop $87_0$ to bring it into the One state. It may also be confirmed that if the new digit is the same as the digit stored in the flip-flop $87_0$, the two gate circuits 92 and 93 are both blocked; there is no action on the flip-flop $87_0$ which remains in its previous state. The inputs $94_0$ to $94_{31}$ of FIGURE 4 are those designated by 51 to 74 in FIGURE 3 (in this last figure, only twenty-four memories of the store 35 are used out of thirty-two) and the outputs $95_0$ to $95_{31}$ of FIGURE 4 are those designated by 151 to 174 in FIGURE 3.

Circuits permitting a passage from two lines each transmitting the digits One and the digits Zero, each of these two digits being represented by the presence of a signal, to a single line transmitting both the Zero digits in the form of the absence of signals and the One digits in the form of the presence of signals are well known in the art and do not need to be described in detail.

Although the invention has been described with reference to an example of a concrete embodiment, it is understood that numerous modifications which may easily be imagined by one skilled in the art are possible, particularly with regard to the structure of the stores constituting the trunk meter compartments and the subscribers' meter compartments and that of the temporary store, and that these modifications come within the scope of the invention.

What I claim is:

1. In a telephone crossbar system having non-numerical subscriber selection stages and numerical group selection stages connected through interstage links, junctors inserted on said links and means for registering the addresses of the calling subscribers, a system for charging subscribers wherein the supervision of the charging is effected at the junctors, comprising means for counting the charging pulses relative to a call, said count at a given instant constituting the actual current charge, first temporary stores respectively associated with the junctors and adapted to store the address of a calling subscriber and the actual current charge, second temporary stores respectively associated with the subscribers and adapted to store the cumulative charges relative to said subscribers, a stepping register adapted to be cyclically connected to said first temporary stores and selectively connected to said second temporary stores, means for scanning the junctors of the crossbar system in synchronism with the stepping register and deriving therefrom a principal datum signal having two values respectively representing the engagement and the disengagement of a junctor for a call, means for cyclically transferring said principal datum signal and said actual current charge respectively from said scanning means and said counting means to said first temporary store associated with said junctor via the stepping register, means for transferring the address of the calling subscriber from said registering means to said first temporary store associated with said junctor via the stepping register, means controlled by the principal datum signal representing the disengagement of the junctor for adding the actual current charge written in the first temporary store at the junctor disengagement instant to the cumulative charge written in the second temporary store associated with the calling subscriber having said address and means for transferring the new cumulative charge resulting from the addition into said second temporary store.

2. In a telephone crossbar system having non-numerical subscriber selection stages and numerical group selection stages connected through interstage links, junctors inserted on said links and means for registering the addresses of the calling subscribers, a system for charging subscribers wherein the supervision of the charging is effected at the junctors, comprising means for counting the charging pulses relative to a call, said count at a given instant constituting the actual current charge, first temporary stores respectively associated with the junctors and adapted to store the address of a calling subscriber and the actual current charge, second temporary stores respectively associated with the subscribers and adapted to store the cumulative charges relative to said subscribers, a stepping register adapted to be cyclically connected to said first temporary stores and selectively connected to said second temporary stores, means for scanning the junctors of the crossbar system in synchronism with the stepping register and deriving therefrom a principal datum signal having two values respectively representing the engagement and the disengagement of a junctor for a call and a supplementary datum signal having two values representing samples of the charging pulses, means for cyclically transferring said principal datum signal, said supplementary datum signal and said actual current charge respectively from said scanning means and said counting means to said first temporary store associated with said junctor via the stepping register, means for transferring the address of the calling subscriber from said registering means to said first temporary store associated with said junctor via the stepping register, gating means inserted between respectively the scanning means, the registering means and the counting means on the one hand and the stepping register on the other hand and respectively adapted to control the writing in the stepping register of the principal and supplementary datum signals, the address of the calling subscriber and the actual current charge, a comparator adapted to compare the prior principal and supplementary datum signals as written in the first temporary store associated with a junctor and transferred in the stepping register and the corresponding actual principal and supplementary datum signals as scanned in said junctor, means controlled by said comparator for selectively controlling said gating means, means controlled by the principal datum signal representing the disengagement of the junctor for adding the actual current charge written in the first temporary store at the junctor disengagement instant to the cumulative charge written in the second temporary store associated with the calling subscriber having said address and means for transferring the new cumulative charge resulting from the addition into said second temporary store.

3. A system for charging subscribers as claimed in claim 2 which comprises first gating means inserted between the first and second temporary stores and the input of the stepping register and second gating means inserted between the output of the stepping register and said first and second temporary stores, and means controlled by the comparator for closing said access gating means when at least one among the following data, principal and supplementary datum signals, address of the calling subscriber, actual current charge is to be entered into the stepping register by the corresponding transferring means.

4. A system for charging subscribers as claimed in claim 2 characterized in that the first temporary stores associated with the junctors and the second temporary stores associated with the subscribers are separate compartments on one and the same magnetic drum.

References Cited by the Examiner

UNITED STATES PATENTS

| | | | |
|---|---|---|---|
| 2,668,875 | 2/1954 | Shepherd | 179—7.1 |
| 3,164,677 | 1/1965 | Morris et al. | 179—7.1 |

ROBERT C. BAILEY, *Primary Examiner.*

R. M. RICKERT, *Assistant Examiner.*